(12) United States Patent
Mensch et al.

(10) Patent No.: US 8,909,657 B2
(45) Date of Patent: Dec. 9, 2014

(54) CONTENT BASED FILE CHUNKING

(75) Inventors: James L. Mensch, San Jose, CA (US);
Cameron Stuart Birse, San Jose, CA (US); Ronnie G. Misra, San Jose, CA (US); Eric Olaf Carlson, Mountain View, CA (US); Dominic B. Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 13/250,504

(22) Filed: Sep. 30, 2011

(65) Prior Publication Data
US 2012/0185448 A1 Jul. 19, 2012

Related U.S. Application Data

(60) Provisional application No. 61/433,152, filed on Jan. 14, 2011.

(51) Int. Cl.
*G06F 17/30* (2006.01)

(52) U.S. Cl.
CPC .... *G06F 17/30017* (2013.01); *G06F 17/30156* (2013.01); *G06F 17/30206* (2013.01); *G06F 17/30091* (2013.01); *G06F 17/30038* (2013.01)
USPC ............ 707/755; 707/756; 707/695; 707/701

(58) Field of Classification Search
USPC .................................. 707/755, 636, 695, 701
See application file for complete search history.

(56) References Cited

U.S. PATENT DOCUMENTS

| | | | |
|---|---|---|---|
| 4,807,182 A | 2/1989 | Queen | |
| 5,559,991 A | 9/1996 | Kanfi | |
| 5,990,810 A | 11/1999 | Williams | |
| 6,018,772 A | 1/2000 | Kamalski | |
| 7,519,635 B1 | 4/2009 | Haustein et al. | |
| 8,364,624 B2 * | 1/2013 | Koponen et al. | 706/47 |

(Continued)

FOREIGN PATENT DOCUMENTS

| | | |
|---|---|---|
| JP | 2005302004 | 10/2005 |
| JP | 200631686 | 2/2006 |
| JP | 2008109499 | 5/2008 |

OTHER PUBLICATIONS

Athicha Muthitacharoen et al.; A low-bandwidth Network File System, MIT Laboratory for Computer Science and NYU Department of Computer Science, 2 pages.

(Continued)

*Primary Examiner* — Debbie Le
(74) *Attorney, Agent, or Firm* — Fish & Richardson P.C.

(57) ABSTRACT

Methods, systems, and apparatus, including computer programs encoded on a computer storage medium, for transferring electronic data. In general, one aspect of the subject matter described in this specification can be embodied in methods that include the actions of identifying a data item to be chunked; determining the type of the data item; determining whether the type of the data item is one of a specified one or more types; if it is determined that the type of the data item is not one of the specified one or more types, performing a first chunking of the data item; and if it is determined that the type of the data item is one of the specified one or more types, performing a second chunking of the data item that is based on the particular content portions of the data item.

26 Claims, 6 Drawing Sheets

(56) References Cited

U.S. PATENT DOCUMENTS

| | | | |
|---|---|---|---|
| 8,392,832 B2* | 3/2013 | Arastafar | 715/273 |
| 8,438,167 B2* | 5/2013 | Ma | 707/741 |
| 8,639,648 B2* | 1/2014 | Koponen et al. | 706/47 |
| 2002/0188728 A1* | 12/2002 | Ballard | 709/227 |
| 2007/0067332 A1* | 3/2007 | Gallagher et al. | 707/102 |
| 2007/0297415 A1 | 12/2007 | Lee et al. | |
| 2008/0243879 A1 | 10/2008 | Gokhale et al. | |
| 2008/0263109 A1 | 10/2008 | Patterson | |
| 2009/0292838 A1* | 11/2009 | Wong | 710/52 |
| 2010/0036887 A1 | 2/2010 | Anglin et al. | |
| 2010/0094817 A1 | 4/2010 | Ben-Shaul et al. | |
| 2010/0195499 A1 | 8/2010 | Dattagupta et al. | |
| 2010/0228795 A1* | 9/2010 | Hahn et al. | 707/812 |
| 2010/0313040 A1 | 12/2010 | Lumb | |
| 2011/0196854 A1* | 8/2011 | Sarkar | 707/709 |
| 2011/0210907 A1* | 9/2011 | Martin-Cocher et al. | 345/1.3 |
| 2011/0282884 A1* | 11/2011 | Ma | 707/741 |

OTHER PUBLICATIONS

Udi Mander, "Finding Similar Files in a Large File System", Report TR-93-33, Dept. of Computer Sciences, Univ. of Arizona, Oct. 1993, 11 pages.

Michael Rabin, Fingerprinting by Random Polynomials, Dept. of Mathematics, Hebrew University of Jerusalem and Dept. of Computer Sciences, Harvard University, Report TR-15-81, 1981, 14 pages.

Office action issues in Japanese Patent Application No. 2013-549560 on Aug. 22, 2014, 7 pages.

* cited by examiner

CONTENT BASED FILE CHUNKING

CROSS-REFERENCE TO RELATED APPLICATIONS

This application claims the benefit under 35 U.S.C. §119 (e) of the filing date of U.S. Patent Application No. 61/433,152, for Content Based File Chunking, which was filed on Jan. 14, 2011, and which is incorporated here by reference.

BACKGROUND

This specification relates to transmitting and storing electronic data.

Data items, for example files, are often transferred to different devices. For example, they can be shared with other devices (e.g., peer devices) or transferred to a server or other storage device (e.g., as a backup or remote storage of the data item). Transferring large data items can consume networking resources as well as create problems when a transfer is interrupted prior to completion. Consequently, conventional systems typically split large data items into chunks before transmitting the data items to a destination device.

SUMMARY

This specification describes technologies relating to transferring and storing electronic data.

In general, one aspect of the subject matter described in this specification can be embodied in methods that include the actions of identifying a data item to be chunked; determining the type of the data item; determining whether the type of the data item is one of a specified one or more types; if it is determined that the type of the data item is not one of the specified one or more types, performing a first chunking of the data item; and if it is determined that the type of the data item is one of the specified one or more types, performing a second chunking of the data item that is based on the particular content portions of the data item. Other embodiments of this aspect include corresponding systems, apparatus, and computer programs recorded on computer storage devices, each configured to perform the operations of the methods.

These and other embodiments can each optionally include one or more of the following features. Performing the second chunking includes: introspecting the data item; generating a data map of content portions within the data item based on the introspection; and chunking the data item based on the data map. Performing the second chunking includes using the generated data map to define content based chunking boundaries. Generating the data map includes identifying different types of content within the data item. Identifying a type of data item includes identifying a file extension associated with the data item. Chunking the data item based on the data map includes separately chunking different types of content. The method further includes sending the chunks to a destination. The method further includes encrypting each chunk prior to sending. The method of claim further includes, in response to receiving a request for the data item: sending a list of chunks, each chunk having a chunk identifier, to the requestor; receiving a request for one or more chunks of the data item from the list of chunks, the requested one or more chunks being chunks that have changed from an earlier version of the data item; and sending the requested one or more chunks.

In general, one aspect of the subject matter described in this specification can be embodied in methods that include the actions of receiving a data item to be chunked; identifying a type associated with the data item; using the identified type to introspect the data of the data item and build a content based map of the data item; and using the content based map to identify a separate chunking to be performed for different content portions in the data item; and chunking the data item based on the content in the data item. Other embodiments of this aspect include corresponding systems, apparatus, and computer programs recorded on computer storage devices, each configured to perform the operations of the methods.

These and other embodiments can each optionally include one or more of the following features. Building the content based map includes identifying different types of content within the data item. Chunking the data item includes performing separate chunking operations on one or more types of content identified within the data item.

Particular embodiments of the subject matter described in this specification can be implemented so as to realize one or more of the following advantages. Content based chunking of data items allows portions of data items that remain unchanged to maintain the same chunks. This can increase de-duplication of chunks for subsequent versions of the data items. As a result, the number of chunks stored and transmitted can be reduced such that processing costs and network usage are also reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Data items are split into two or more chunks for transmission, for example, to peer devices or other destination locations (e.g., a remote storage device or a backup server). Data items having particular types can be split into chunks based on the content of the data items. Other data items that are not of the particular types can be split into chunks according to a chunking process that does not use the content of the data items.

Content based chunking can increase the amount of data that is unchanged between versions. Chunks of a later version of a data item can be compared to the chunks of an earlier version of the data item stored at the destination location. Only those chunks that have changed are then transmitted to the destination location. This reduces the duplication of content from versions of data items transmitted and/or stored, referred to in the present specification as de-duplication.

Figure 1:
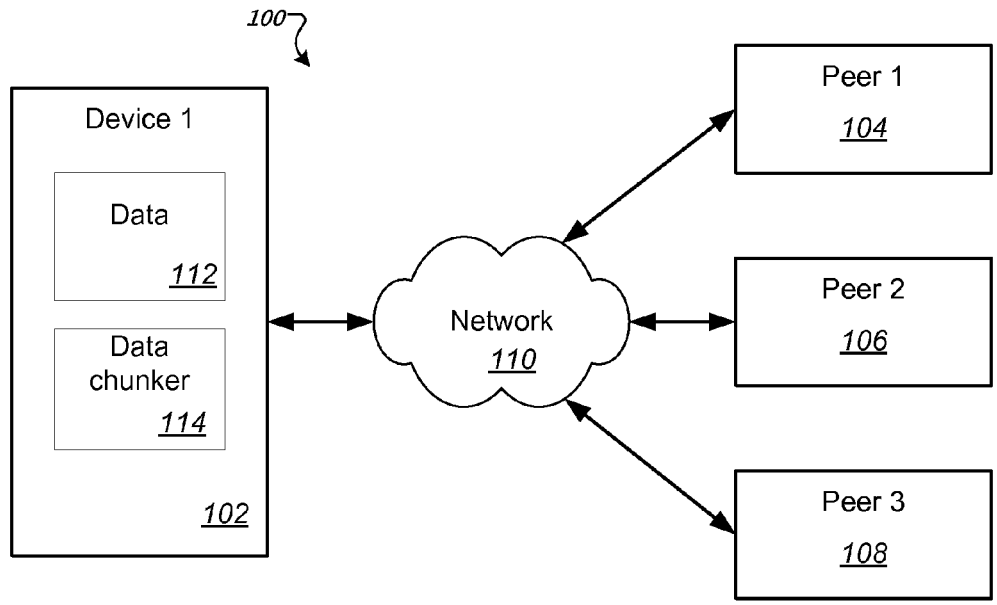
FIG. 1 is a block diagram of an example peer system for transferring chunked data items.
Figure 2:
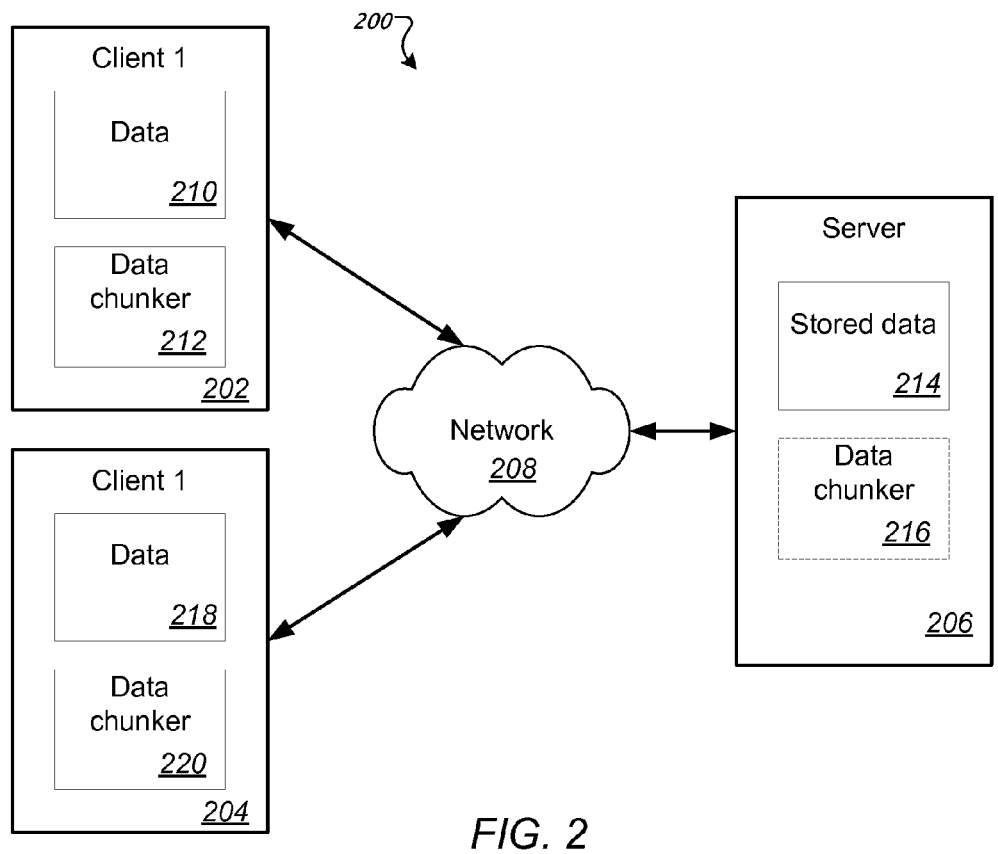
FIG. 2 is a block diagram of an example client server system for transferring chunked data items.

FIGS. 1-2 show block diagrams of example systems in which chunked data items can be transmitted. FIG. 1 is a block diagram of an example peer system 100 for transferring chunked data items. Peer system 100 includes device 102 and peer devices 104, 106, and 108 coupled through a network 110. The device 102 and peer devices 104, 106, and 108 can be various types of computing devices including, but not limited to, desktop computers, laptop computers, tablet devices, mobile devices, personal data assistants, etc. The network 110 can be part of a local area network, wide area network, or the Internet.

Device 102 is shown including data 112 and data chunker 114. The data 112 includes various types of data items stored on the device, for example, e-mail, photos, documents, etc. The data chunker 114 can split one or more types of data items stored in the data 112, as described in more detail below with respect to FIGS. 3-4. The split data items can be transmitted from the device 102 to one or more of the peer devices 104, 106, and 108, for example, for synchronization (e.g., of e-mail) or to transfer particular data items (e.g., a particular presentation document). A given peer device can combine the chunks to reform the data item or can store the chunks until needed.

FIG. 2 is a block diagram of an example client server system 200 for transmitting chunked data items. Client server system 200 includes client device 202, client device 204, server 206, and network 208. The client devices 202 and 204 can be various types of computing devices including, but not limited to, desktop computers, laptop computers, tablet devices, mobile devices, personal data assistants, etc. The network 208 can be part of a local area network, wide area network, or the Internet.

Client device 202 includes data 210 and data chunker 212. Similarly, client device 204 includes data 218 and data chunker 220. The data chunkers 212 and 220 can split one or more types of data items stored in the data 112, as described in more detail below with respect to FIGS. 3-4. The client devices 202 and 204 may be associated with a single individual (e.g., a desktop and mobile device of a particular user) or may belong to distinct users. For example, two users may use the same backup storage server.

The server 206 includes stored data 214 received from client devices 202 and 204. The server 206 can received data items for storage as chunks from the client devices 202 and 204. In some implementations, the data items are stored as the chunks, e.g., in a chunk storage and are reconstituted when needed, for example, when opened by a peer device on which the chunks are stored. In some other implementations, stored chunks are fetched as necessary, for example, when the data item is requested or when only that portion of the data item is necessary. In yet some other implementations, the chunks are reconstituted into the respective data items for storage as stored data 214. In some implementations, the server 206 includes data chunker 216. The server 206 can chunk requested data items stored on the server 206 before delivering them to, for example, to a requesting client device.

Figure 3:
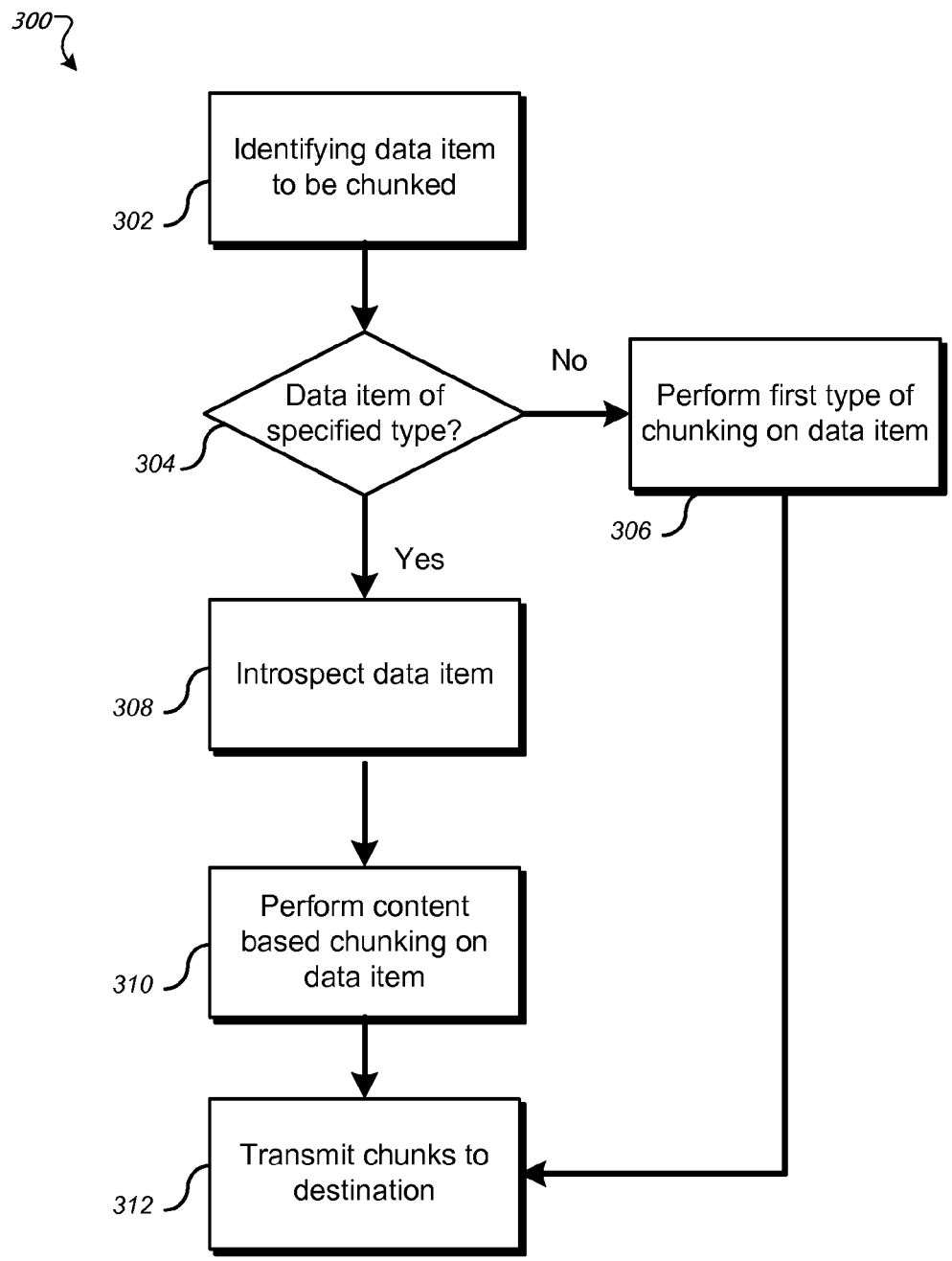
FIG. 3 is a flow diagram of an example process for transferring chunked data items.

FIG. 3 is a flow diagram of an example process 300 for transferring chunked data items. The process 300 can be performed, for example, by a system including one or more computing devices, e.g., by one or more computers, mobile devices, tablet devices, or servers.

A data item to be transmitted is identified (step 302). The data item to be transmitted can be identified, for example, in preparation to sending the data item to a particular recipient. For example, a request for the data item can be received from another device. In another example, the data item can be sent to another device for storage e.g., according to a schedule or other criteria. The data item can be a file, folder, or other data. For example, the data item can be a document, a media file (e.g., image, audio, or video), e-mail, or other type of file data.

A determination is made as to whether the data item has a specified type (step 304). The type of the data item can be identified, for example, using the file extension of the data item. In some other implementations, the type of data can be identified using other data, for example, file headers, magic numbers, or other data patterns indicative of a particular type of data item. The type of the data item can be compared to a list of specified types to determine if there is a match. The list of specified types can be generated, for example, according to the types in which a particular chunking process has been generated. For example, if a content based chunking process has been generated for a .MP3 audio file (i.e. an audio file encoded in the MPEG-1 or MPEG-2 Audio Layer 3 format), this type is added to the list of types.

If it is determined that the file is not one of the specified types, a first type of chunking is performed on the data item (step 306). The first type of chunking is based on data lengths and not the particular content portion of the data item. Various chunking techniques can be used that chunk the data item into a series of chunks based on a particular chunk size and the amount of data to chunk. The first type of chunking can be fixed or variable length chunking based on the size of the data item. Fixed length chunking generates chunks of a fixed size while variable length chunking allows for chunk sizes within a range according to specified chunking criteria.

A conventional example sequence for the first type of chunking includes first determining whether the amount of data to be chunked is greater than a minimum chunk size. If the amount of data is not greater than a minimum chunk size, then chunking is not necessary. If the amount of data to be chunked is greater than the minimum chunk size, then the chunk ends are identified for each chunk of the data. This can include performing one or more checksum operations (e.g., a rolling checksum such as a Rabin checksum) to define a particular number of bytes of the data item to chunk (e.g., 40 kilobytes). In particular, when not using a fixed size chunk, but allowing some range of chunk size, the chunk ends are identified starting with a minimum chunk size and increasing toward the maximum chunk size depending on rolling checksum results. Thus, each chunk size can be within the range minimum chunk≤chunk≤maximum chunk.

Each chunk is then assigned a particular chunk identifier, for example, from a hash of the chunk data. In particular, in some implementations, a secure hash algorithm (SHA) is used to generate the chunk identifier. The process is repeated to generate subsequent chunks from the remaining data of the data item until the data left to chunk is less than the minimum chunk size.

The chunks are transmitted to a destination (step 312). The chunks can be transmitted as they are generated, after some specified delay, or after all chunks for the data item have been generated. In some implementations, network bandwidth is determined and used as a factor in determining when and at what rate to send the chunks.

If the data item is of the specified type, the data item is introspected to identify particular portions of data within the data item (step 308). For example, for a presentation file (e.g., a slide presentation), the introspection can identify portions of the file corresponding to different types of content e.g., a slide index, images, and slide text. The identified content portions can then be used to perform content based chunking on the data item (step 310).

Content based chunking is described in more detail below with respect to FIG. 4. As with the first type of chunking, the chunks generated from the content based chunking are transmitted to the destination (step 312).

Figure 4:
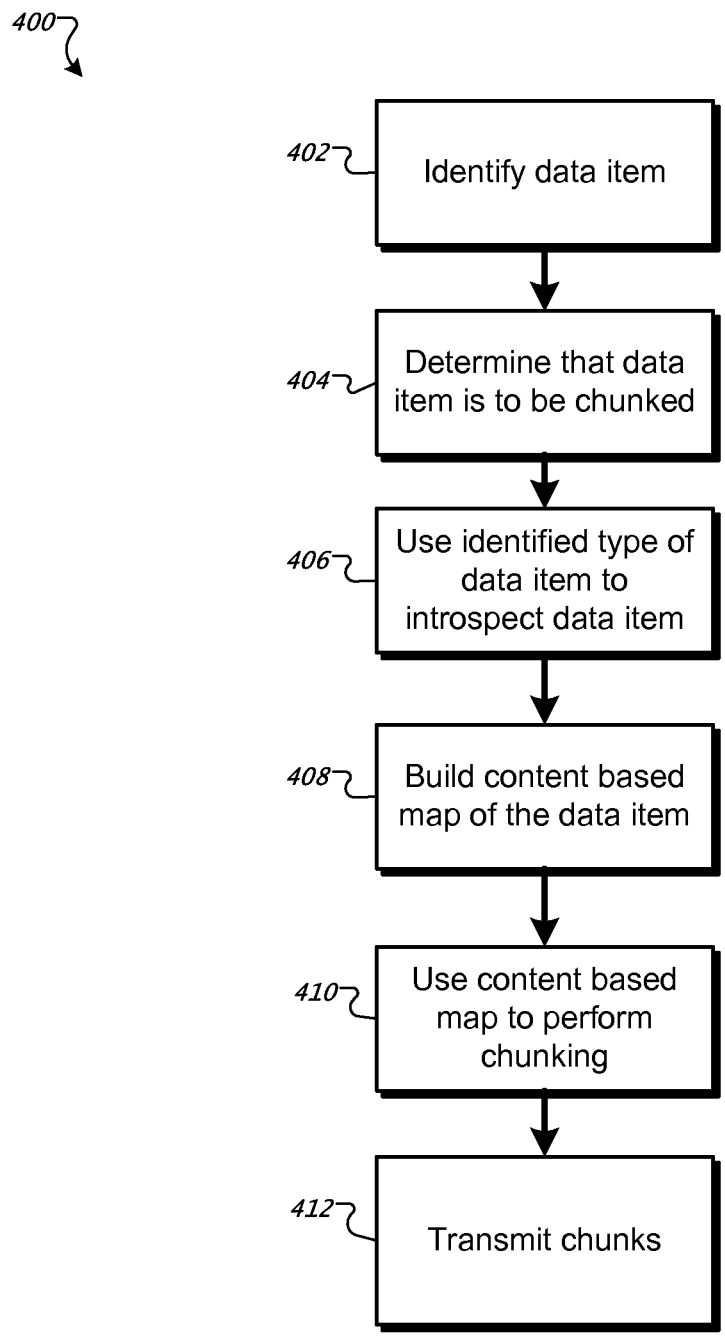
FIG. 4 is a flow diagram of an example process for content based chunking.

FIG. 4 is a flow diagram of an example process 400 for content based chunking. The process 400 can be performed, for example, by a system including one or more computing devices, e.g., by one or more computers, mobile devices, or servers.

A data item to be chunked is identified (step 402). The data item to be chunked can be identified, for example, based on a request for a particular data item from another device or a command to send a particular data item to another device (e.g., a backup, remote storage, or peer) as described above with respect to FIG. 3. The data item can be identified for chunking if it exceeds a specified size. The specified size may be the same as or greater than a chunking size.

A determination is made that the data item is to have content based chunking performed (step 404). Determination that content based chunking is to be performed can be based on matching a type of the data item to one of a group of specified types. In particular, the type of the data item can be identified and compared to a list for which content based chunking is available.

The type of the data item is used to introspect the data item (step 406). Introspecting the data item allows for the identification of different types of content within the data item. For example, a slide presentation can include a slide index, images, text, etc. Similarly, an audio file includes metadata tags in addition to the audio data (e.g., a song or other audio content).

A content based map is built for the data item based on the introspection (step 408). In particular, the portions of the data item corresponding to different types of content (different content portions) are identified in order. Thus, for example, instead of simply identifying an audio data item, the portions of the audio file corresponding to audio data and the portions corresponding to tags can be separately identified.

The content based map is used to chunk the data item (step 410). In particular, the content based map can be used to identify content portions of the data item that are not likely to change between versions of the data item. For example, for an audio file, the tags can change each time the audio is played. For example, a play count can be incremented or a last played date can be updated. However, the data corresponding to the audio content itself (e.g., the song itself) will typically remain unchanged. Content based chunking can chunk different types of content within a data item separately so that content unlikely to change between versions or uses will have the same chunks each time the data item is chunked.

The type of processing or chunking performed can depend on whether or not the content is likely to change. For example, chunking boundaries (e.g., boundaries across which a chunk cannot extend) can be established between different types of content in the data item. Additionally, the type of chunking performed can change depending on the particular content.

For example, images in a presentation file can be chunked in fixed size chunks. In particular, each image can be separately chunked. Additionally, image data and tag data can be chunked separately. In particular, both the image data and tag data can be separately chunked e.g., in fixed size chunks. The fixed size chunks each have the same size up until the last chunk, which may be smaller depending on the remaining data. For example, an item of size 1.6 megabyte (MB) and a fixed chunk size of 1 MB will result in two chunks, a first chunk having 1 MB and a second chunk of 0.6 MB. Since the picture is unlikely to change, these fixed size chunks are unlikely to change when the data item is chunked again. Because of the chunk boundaries, additional data (e.g., data following the image in the presentation file) won't be added from other content to fill up the fixed size chunk. Thus, even if the chunks in one content portion change in a subsequent version, they won't cross over to other content portions changing those chunks as well.

In another example, the portions that are more likely to change can be chunked using a more variable chunk size (e.g., as described above with respect to FIG. 3) in an attempt to reduce the number of chunks that will change for a given modification. Thus, a change in play count for an audio file will not necessarily change all chunks within the tags portion of the audio data item.

Each chunk is assigned a chunk identifier, for example, according to a hash function applied to each generated chunk as described above.

The chunked data is transmitted to a destination (step 412). For example, the chunks can be transmitted to a requesting device or to a storage server. In some implementations, only some of the chunks are transmitted. For example, a request for a later version of a data item can lead to only those chunks that have changed from an earlier version being transmitted, as described in greater detail below with respect to FIG. 7. For example, if an audio type data item has only changed chunks associated with the tags, the chunks for the audio data, which form most of the data item, do not need to be transmitted.

In some implementations, content based chunking can be performed recursively depending on the content. In particular, when a data item is a container having one or more additional types of content (e.g., MS word, zip, jar, etc.), the introspection identifies the bounds of the embedded content or content and then identifies one or more corresponding content based chunkers for each type of embedded content. For example this allows to recognize a picture embedded in another file format and apply the appropriate content based chunker (e.g., for images) to that portion of the file.

Figure 5:
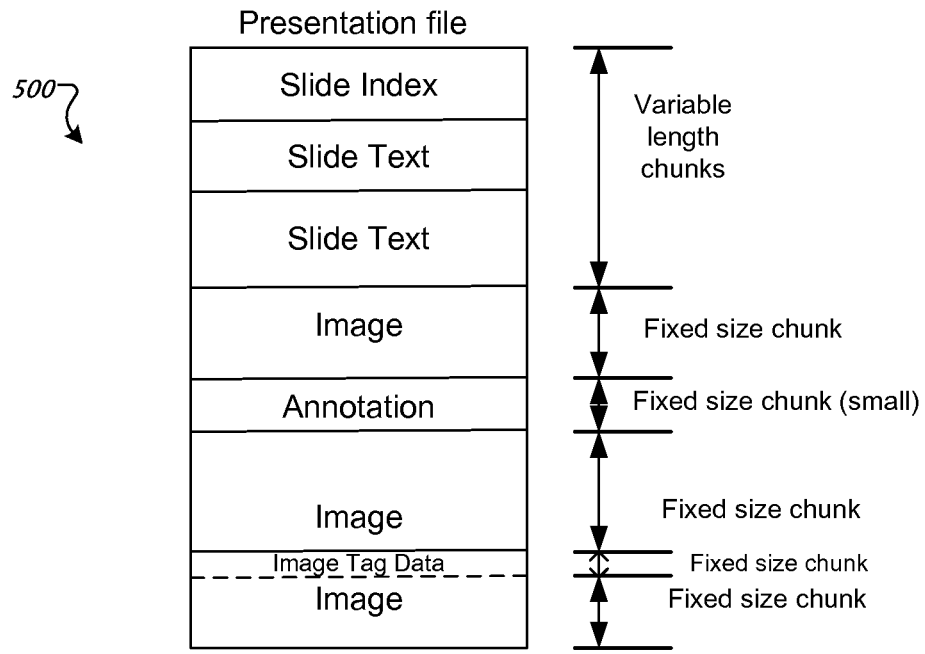
FIG. 5 shows an example content based mapping of a presentation file.

FIG. 5 shows an example content based mapping 500 of a presentation file and corresponding content based chunking portions. In particular, the example of FIG. 5 is a presentation data item (e.g., a slide presentation). The introspection has identified different content arranged as shown in the content based mapping 500. In the example presentation file shown in FIG. 5, a slide index is followed by slide text, an image, an annotation, and two more images. Portions of the data item to be chunked together are identified based on the content based mapping.

For example, as shown in FIG. 5, the slide index and slide text can be chunked together, for example, as variable length chunks (e.g., as described above with respect to FIG. 3). The chunking portion is bounded by the first image in the presentation file so that the last chunk will not cross into the image. This allows distinct chunks to be used for different types of content such that unchanging content can retain the same chunks across versions. Chunk de-duplication can result when sending the data item to a destination because only those chunks that have changed need to be sent.

The images are shown as having fixed size chunks. Each image is chunked separately. In addition, for each image, image data can be chunked separately from any image tag data. For illustration, FIG. 5 shows one example image separating out the image tag data from the image data. Additionally, in some implementations, tag data can be chunked as variable length chunks instead of fixed size chunks as shown.

In some implementations, the chunking is further refined within particular content. For example, if the image is a JPEG image, a type specific content based chunking can be performed that includes a small fixed size chunking for a metadata portion of the image and a different fixed size chunking for the remaining image data.

Figure 6:
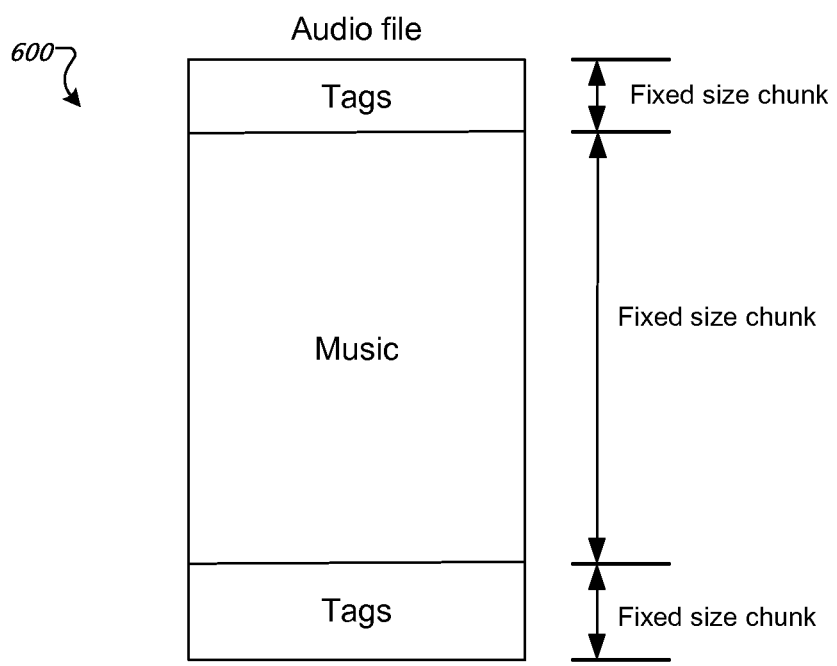
FIG. 6 shows an example content based mapping of an audio file.

FIG. 6 shows an example content based mapping 600 of an audio file. The content based mapping includes a music portion sandwiched between two tag portions. Each of these portions can be separately chunked, for example, using fixed sized chunks. Thus, if a tag is modified or added in a later version, only the chunks in the tags portion will change.

By contrast, using a chunking technique that is not content based, e.g., as described with respect to FIG. 3 below, could lead to few chunks being unchanged. For example, a modification or addition of tags to the first tags portion at the beginning of the audio data item can result in the chunk boundaries changing throughout the entire data item. In particular, since there is no chunking boundary, a chunk can cross to include tag data and music data. As a result, a request for a new version can require a full set of chunks being sent, since an early change in a generated chunk (e.g., a modified chunk boundary due to added data) can be propagated throughout the entire data item, resulting in little or no chunk de-duplication.

In some implementations, encrypted chunks are generated. For example, convergent encryption can be used. Convergent encryption allows for non-secure chunk storage. The individual chunks having a chunk identifier can be encrypted with a key corresponding to the hash identifier of the chunk, for example, ASE encryption. A new chunk identifier can be generated for each chunk by performing a hash of the encrypted chunk. Other encryption schemes can alternatively be used. For example, a shared key or private/public key encryption scheme can be used.

Figure 7:
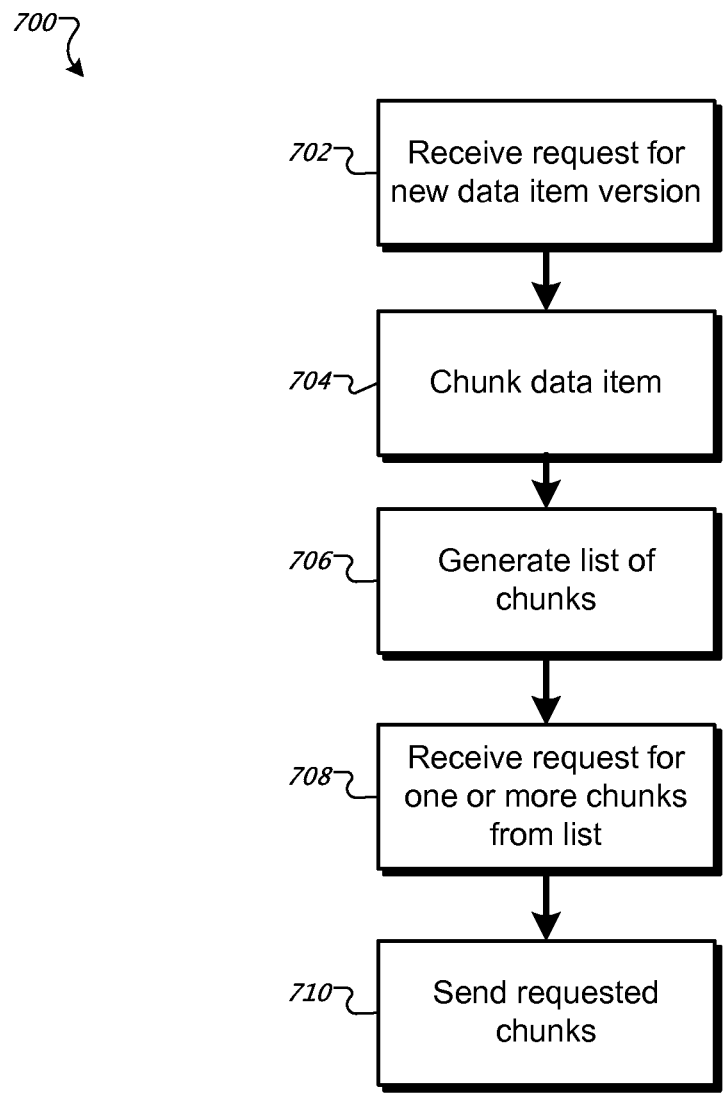
FIG. 7 is a flow diagram of an example process for providing chunks in response to a request for a data item.

FIG. 7 is a flow diagram of an example process 700 for providing chunks in response to a request for a data item. A request for a new data item version is received (step 702). For example, during a synchronization process, a later version of data item can be identified as not present on a peer device. The peer device can then request the later version of the data item. Alternatively, a computing device can request all changed data items (e.g., since a last backup or storage event) for uploading to a backup server.

The data item is chunked (step 704). The data item is chunked as described above depending on the type of data item. In some implementations, content based chunking is performed on the data item as described with respect to FIGS. 4-6.

A list of chunks (e.g., according to chunk identifier or encrypted chunk identifier) is generated (step 706). For example, each chunk can have an identifier according to an applied hash function. Thus, if the data of a particular chunk is unchanged from a previous version, the hash is also unchanged. In some implementations, the list of chunks is sent to a requesting device, e.g., a peer device that requested the data item. In some other implementations, the list of chunks is submitted to a backup server or other device to which the data item (or portions thereof) will be sent. The list of chunks can be compared with those already present on the requesting device.

A request for one or more chunks from the list is received (step 708). For example, a device can send a request only for the new chunks of the data item and not for those that remain the same and are already available on the device. Thus, redundant chunks do not need to be transmitted and duplicated on the storage device. The requested chunks are sent (step 710). The unsent chunks can be stored or discarded.

In some implementations, stored chunks can be shared between multiple users. For example, a particular audio file can include tag information that is unique to each user (e.g., play count), but the audio content will remain the same. Thus, if multiple users store the same audio file at a remote storage location, it is not necessary to store multiple copies of the common audio data.

In particular, for users applying the same content chunking technique, the chunk identifiers for the audio portion of the audio file should match for each user. Thus, when sending the list of chunks to the remote storage location, the common chunks can be identified from another user that had already stored the audio file. As a result, only the chunks unique to the user (e.g., for the tag information) need to be transmitted for storage.

In some implementations, chunks can be fetched as needed. For example, when streaming data from another location, chunks of the streaming data can be fetched as needed. For example, if the data item is a movie file, chunks can be fetched only as needed, e.g., as playback proceeds. The chunks can be requested sequentially or randomly, but not all chunks need to be transmitted at once. Another example is a client that indexes data. For example, a music player application can fetch only the tag data of audio files to generate an index of all of the files, but would not require the actual audio data (e.g., the chunks corresponding to the audio data) until the files are actually played.

In some implementations, because of policy, licensing terms, etc., it may be necessary to require that each user transmit all chunks of particular types of data items to the remote storage location to establish proof that the user actually possesses the data in question. However, the remote storage location can still retain only a single copy of the chunks because they are known to be identical, e.g., since they have the same identifier.

Figure 8:
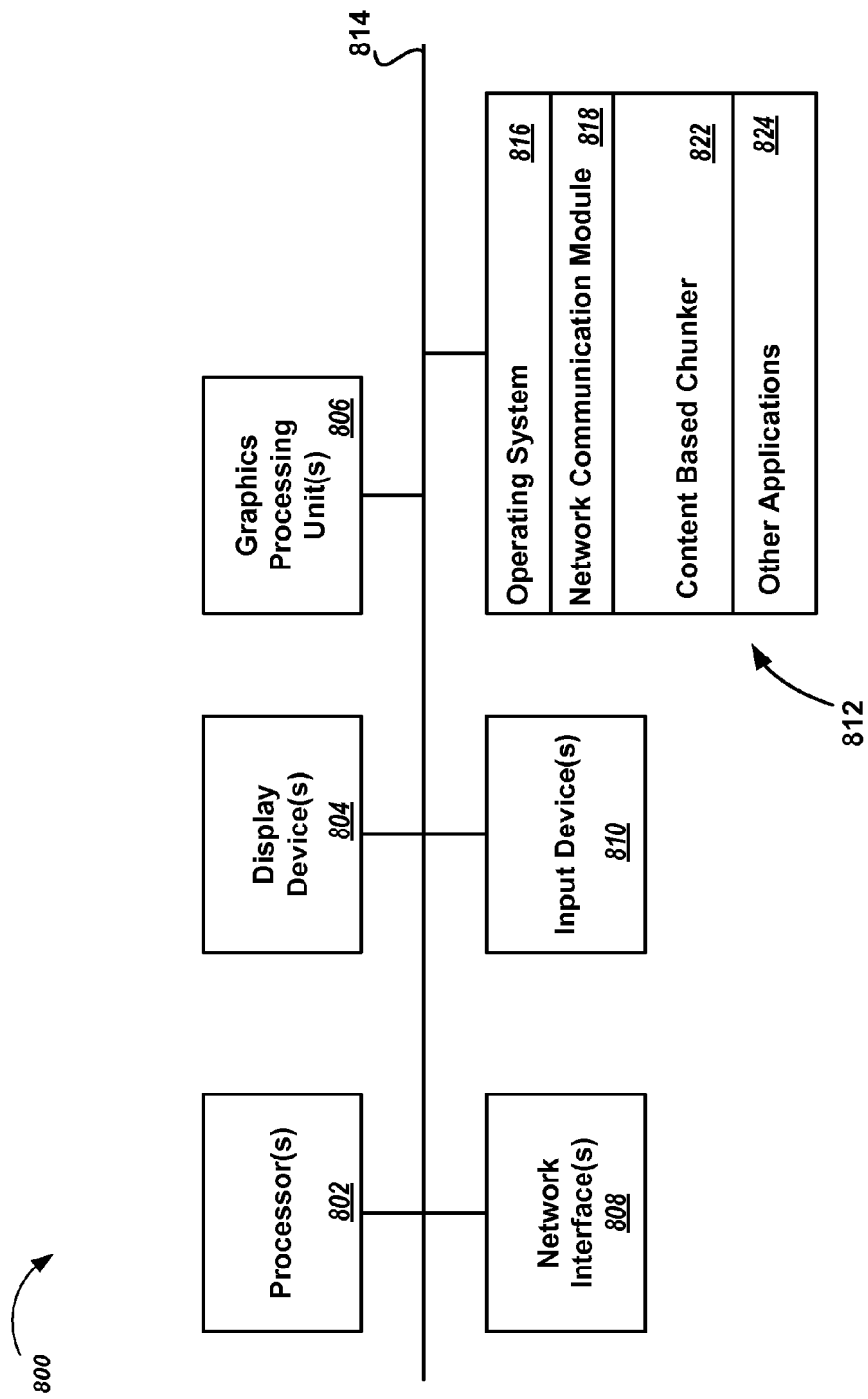
FIG. 8 illustrates an example architecture of a system.

FIG. 8 illustrates an example architecture of a system 800. The system architecture 800 is capable of performing operations for performing content based chunking of data items. The architecture 800 includes zero or more processors 802 (e.g., IBM PowerPC, Intel Pentium 4, ARM etc.), zero or more display devices 804 (e.g., CRT, LCD), zero or more graphics processing units 806 (e.g., NVIDIA GeForce, etc.), zero or more network interface 808 (e.g., Ethernet, FireWire, USB, etc.), zero or more input devices 810 (e.g., keyboard, mouse, etc.), and zero or more computer-readable mediums 812. These components exchange communications and data using one or more buses 814 (e.g., EISA, PCI, PCI Express, etc.). In some implementations, some remote storage and/or chunking systems may not include display devices or peripherals. Additionally, chunks can be stored on network or remote storage devices that interact with one or more other systems to process and store data chunks.

The term "computer-readable medium" refers to any medium that participates in providing instructions to a processor 802 for execution. The computer-readable medium 812 further includes an operating system 816 (e.g., Mac OS®, iOS®, Windows®, Linux, etc.), a network communication module 818, a content based chunker 822, and other applications 824.

The operating system 816 can be multi-user, multiprocessing, multitasking, multithreading, real-time and the like. The operating system 816 performs basic tasks, including but not limited to: recognizing input from input devices 810; sending output to display devices 804; keeping track of files and directories on computer-readable mediums 812 (e.g., memory or a storage device); controlling peripheral devices (e.g., disk drives, printers, etc.); and managing traffic on the one or more buses 814. The network communications module 818 includes various components for establishing and maintaining network connections (e.g., software for implementing communication protocols, such as TCP/IP, HTTP, Ethernet, etc.).

The content based chunker 822 provides various software components for performing the various functions for performing content based chunking as described with respect to FIGS. 1-7.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In some implementations in which the user interacts directly with a system, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying a data item to be chunked;
   determining a data type of the data item;
   determining that the data type of the data item is one of a specified one or more data types; and
   in response to determining that the data type of the data item is one of the specified one or more data types:
   identifying particular content portions that are included within the data item; and
   performing a chunking of the data item that is based on the particular content portions that are included within the data item.

2. The method of claim 1, where performing the chunking includes performing the chunking of the data item based on a likelihood that at least some content portions of the particular content portions will be different than a version of the data item stored at a recipient device.

3. The method of claim 1, where performing the chunking includes:
   introspecting the data item;
   generating a data map of the particular content portions based on the introspection;
   using the generated data map to define content based chunking boundaries; and
   chunking the data item based on the data map.

4. The method of claim 3, where generating the data map includes identifying the different particular content portions within the data item.

5. The method of claim 1, where identifying the data type of the data item includes identifying a file extension associated with the data item.

6. The method of claim 4, where chunking the data item based on the data map includes separately chunking different particular content portions.

7. The method of claim 2, further comprising:
   sending the chunks to a destination.

8. The method of claim 6, further comprising:
   encrypting each chunk prior to sending.

9. The method of claim 1, further comprising:
   in response to receiving a request for the data item:
   sending a list of chunks, each chunk having a chunk identifier, to the requestor;
   receiving a request for one or more chunks of the data item from the list of chunks, the requested one or more chunks being chunks that have changed from an earlier version of the data item; and
   sending the requested one or more chunks.

10. A method performed by data processing apparatus, the method comprising:
    receiving a data item to be chunked;
    identifying a data type associated with the data item;
    using the identified data type to introspect the data of the data item and build a content based map of the data item;
    using the content based map to identify particular content portions included in the data item;
    using the content based map to identify a separate chunking to be performed for the particular content portions in the data item; and
    chunking the data item based on the particular content portions in the data item.

11. The method of claim 10, where building the content based map includes identifying different types of content within the data item.

12. The method of claim 10, where chunking the data item includes performing separate chunking operations on the particular content portions identified within the data item.

13. A computer storage medium encoded with a computer program, the program comprising instructions that when executed by data processing apparatus cause the data processing apparatus to perform operations comprising:
    identifying a data item to be chunked;
    determining that a data type the data item is one of a specified one or more data types;
    in response to determining that the data type of the data item is one of the specified one or more data types:

identifying particular content portions included within the data item;

identifying a first content portion included within the data item that is likely to change relative to an earlier version of the data item and a second content portion included within the data item that is likely to be unchanged relative to an earlier version of the data item;

chunking the first content portion; and chunking the second content portion separately from the first content portion.

14. A computer storage medium encoded with a computer program, the program comprising instructions that when executed by data processing apparatus cause the data processing apparatus to perform operations comprising:

identifying a first data item to be chunked;

determining that the first data item is of a first data type;

in response to determining that the first data item is of the first data type, chunking the first data item based on the size of the data item;

identifying a second data item to be chunked;

determining that the second data item is of a second data type; and in response to determining that the second data item is of a second data type:
identifying particular content portions included in the second data item; and
chunking the second data item based on the likelihood that at least some portions of the particular content portions will be different than an earlier version of the second data item.

15. A system comprising:

one or more computing devices operable to perform operations comprising:

identifying a data item to be chunked;

determining a data type of the data item;

determining that the data type of the data item is one of a specified one or more data types; and in response to determining that the data type of the data item is one of the specified one or more data types:
identifying particular content portions that are included within the data item; and
performing a chunking of the data item that is based on the particular content portions that are included within the data item.

16. The system of claim 15, where performing the chunking of the data item that is based on the particular content portions that are included within the data item includes:

identifying a first content portion that is likely to change between versions;

chunking the first content portion using a variable chunk size;

identifying a second content portion that is likely to be unchanged between versions; and chunking the second content portion using a fixed chunk size.

17. The system of claim 15, where performing the chunking of the data item that is based on the particular content portions that are included within the data item includes:

introspecting the data item;

generating a data map of the particular content portions included within the data item based on the introspection; and using the generated data map to define content based chunking boundaries to chunk the particular content portions.

18. The system of claim 17, where generating the data map includes identifying different types of content within the data item.

19. The system of claim 18, where identifying a type of data item includes identifying a file extension associated with the data item.

20. The system of claim 18, where chunking the data item based on the data map includes separately chunking different types of content.

21. The system of claim 16, further operable to perform operations comprising:

sending the chunks to a destination.

22. The system of claim 21, further operable to perform operations comprising:

encrypting each chunk prior to sending.

23. The system of claim 15, further operable to perform operations comprising:

in response to receiving a request for the data item:
sending a list of chunks, each chunk having a chunk identifier, to the requestor;
receiving a request for one or more chunks of the data item from the list of chunks, the requested one or more chunks being chunks that have changed from an earlier version of the data item; and
sending the requested one or more chunks.

24. A system comprising:

one or more computing devices operable to perform operations comprising:

receiving a data item to be chunked;

identifying a data type associated with the data item;

using the identified data type to introspect the data of the data item and build a content based map of the data item;

using the content based map to identify particular content portions included in the data item;

using the content based map to identify a separate chunking to be performed for the particular content portions in the data item; and chunking the data item based on the particular content portions in the data item.

25. The system of claim 24, where building the content based map includes identifying different types of content within the data item.

26. The system of claim 24, where chunking the data item includes chunking based on a likelihood that at least some content portions of the particular content portions will be different than a version of the data item stored at a recipient device.

* * * * *

UNITED STATES PATENT AND TRADEMARK OFFICE
CERTIFICATE OF CORRECTION

PATENT NO. : 8,909,657 B2  
APPLICATION NO. : 13/250504  
DATED : December 9, 2014  
INVENTOR(S) : James L. Mensch et al.

Page 1 of 1

It is certified that error appears in the above-identified patent and that said Letters Patent is hereby corrected as shown below:

In the Specification

Column 1, Line 7; replace:

"(e) of the filing date of U.S. Patent Application No. 61/433," with

-- (e) of the filing date of U.S. Provisional Patent Application No. 61/433, --

Signed and Sealed this
Fourteenth Day of April, 2015

Michelle K. Lee
*Director of the United States Patent and Trademark Office*